United States Patent [19]

Sejimo et al.

[11] Patent Number: 4,702,867
[45] Date of Patent: Oct. 27, 1987

[54] METHOD FOR CONTINUOUSLY VULCANIZING HOSES

[75] Inventors: Akinobu Sejimo; Shigeo Ono, both of Hadano, Japan

[73] Assignee: Kabushiki Kaisha Meiji Gomu Kasei Tokyo, Japan

[21] Appl. No.: 824,048

[22] Filed: Jan. 30, 1986

[30] Foreign Application Priority Data

Jun. 17, 1985 [JP] Japan .................... 60-131515

[51] Int. Cl.⁴ ............................. B29C 35/10
[52] U.S. Cl. ....................... 264/25; 156/143; 156/149; 264/26; 264/103; 264/127; 264/166; 264/173; 264/236; 264/347
[58] Field of Search ............... 264/25, 166, 173, 103, 264/236, 347, 26, 209.6, 127; 156/149, 143; 219/10.55 M, 10.55 R; 425/174.8 R, 445

[56] References Cited

U.S. PATENT DOCUMENTS

| | | | |
|---|---|---|---|
| 3,255,284 | 6/1966 | Meislohn | 264/166 |
| 3,690,796 | 9/1972 | Borsvold | 264/166 |
| 3,988,189 | 10/1976 | Sullivan | 264/103 |
| 4,104,098 | 8/1978 | Hush et al. | 264/103 |
| 4,112,031 | 9/1978 | Gohlisch | 264/26 |
| 4,415,518 | 11/1983 | Pochurek et al. | 264/166 |
| 4,444,700 | 4/1984 | Fondren | 264/26 |
| 4,481,159 | 11/1984 | Itoh | 264/26 |
| 4,512,942 | 4/1985 | Babbin et al. | 264/26 |

FOREIGN PATENT DOCUMENTS

| | | | |
|---|---|---|---|
| 2011845 | 9/1971 | Fed. Rep. of Germany | 425/174.8 R |
| 2926223 | 1/1981 | Fed. Rep. of Germany | 264/25 |
| 51-75772 | 6/1976 | Japan | 264/25 |
| 59-96936 | 6/1984 | Japan | 425/174.8 R |

*Primary Examiner*—Jeffery Thurlow
*Attorney, Agent, or Firm*—Armstrong, Nikaido, Marmelstein & Kubovcik

[57] ABSTRACT

A method for continuously vulcanizing hoses which comprises two steps: microwave vulcanization; and conventional vulcanization by heat conduction through a heating medium. A layer of heat-resistant synthetic resin which has a melting point higher than the vulcanizing temperature is provided over the outer periphery of a rubber hose in a uniform thickness. This layer is in close contact with the hose but not adherent thereto. After the resin layer is cooled and hardened, the rubber hose is heated and cured in a microwave vulcanizing tank before being subjected to vulcanization by heat conduction through a heating medium in an ordinary vulcanizing tank. After completion of vulcanization, the layer of synthetic resin is peeled off and removed.

4 Claims, 2 Drawing Figures

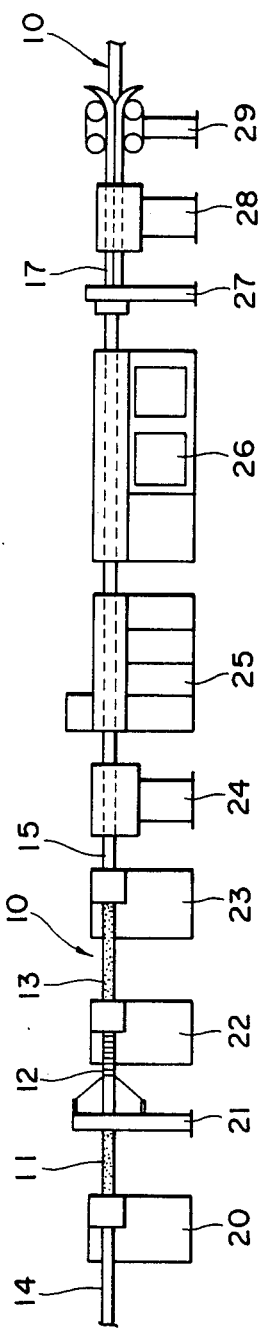
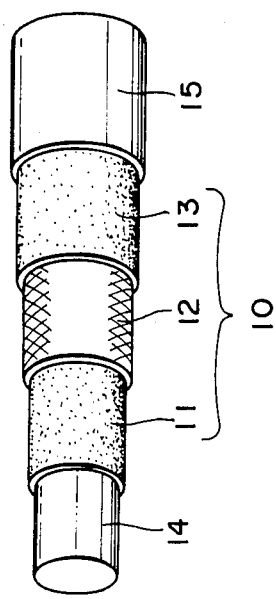
FIG. 1
FIG. 2

METHOD FOR CONTINUOUSLY VULCANIZING HOSES

BACKGROUND OF THE INVENTION

The present invention relates to a method for continuously vulcanizing rubber hoses including hoses reinforced with fibers. More particularly, the method of the present invention comprises the steps of covering the outer periphery of a rubber hose with a resin layer, curing the rubber by means of microwave heat, then vulcanizing it in a heated vulcanizing tank for a given period of time. By this method the vulcanizing time is reduced and less thermal energy is required for the vulcanization.

In the prior art, vulcanization of fiber-reinforced rubber hoses must be conducted in a vulcanizing tank maintained at a high temperature under pressure to prevent foaming of the rubber during vulcanization. To apply pressure to the outer periphery of a hose to prevent foaming of the rubber, a pressurized vulcanizer is commonly used. In another method, the outer periphery of a hose is covered with synthetic resin or lead, upon which pressure is applied. Even when a pressurized vulcanizer can is used and foaming of the rubber is thereby prevented, the surface of a hose which is not covered may become rough and so-called eruptions may be formed, impairing the appearance of the hose. It is therefore a general practice to use cloth, lead, synthetic resin and the like to cover a hose during vulcanization.

The conventional vulcanizing methods have the following problems. It is necessary to cover the outer periphery of a rubber hose with material such as cloth or synthetic resin to obtain a hose having a smooth and lustrous surface, even when a pressurized vulcanizer can is used. Further, since a vulcanizer can must be tightly closed for the application of pressure, it is difficult to conduct continuous vulcanization by these conventional methods.

When the outer periphery of the unvulcanized rubber hose is covered with lead during the heating and vulcanization, not only is careful handling of the lead required, but equipment and operation costs are increased, thereby raising the cost of the product.

When synthetic resin is used for covering the unvulcanized rubber hose, the resin softens as the vulcanizing temperature rises. As the degree of softening increases, the mechanical strength of the resin is proportionally lowered. Such mechanical strength is necessary for preventing foaming of the rubber. In order to prevent this drop in the mechanical strength of the resin during high temperature vulcanization, it is necessary to provide sufficient thickness in the resin layer, or to vulcanize in a pressurized vulcanizer can.

However, the thicker the resin layer is, the longer it takes for the unvulcanized rubber hose to reach the vulcanizing temperature. This will prolong the time required for vulcanization of the rubber hose. Moreover, the thicker the resin layer is, the higher the cost of the product becomes. Even if the resin layer is made sufficiently thick, it is still necessary to maintain the vulcanizing tank at given temperature and pressure in order to carry out continuous vulcanization. In this case, sealing of the vulcanizing apparatus becomes complex, making the system impractical.

BRIEF SUMMARY OF THE INVENTION

The present invention has been developed in view of the above mentioned defects of the prior art. It aims to provide a method for continuously vulcanizing rubber hoses under normal pressure while preventing foaming of the unvulcanized rubber by covering the hose with a thin layer of resin.

Another object of the present invention is to provide a continuous method for heating hoses in two steps, first by means of microwave radiation and then by means of heat conduction using an ordinary heating medium, thereby reducing heating time and saving thermal energy.

The objects and advantages of the present invention will be fully understood from the following description and the accompanying drawings.

BRIEF DESCRIPTION OF DRAWING

FIG. 1 is a flow chart showing the steps of the process of the present invention.

FIG. 2 is a partially exploded front view of a rubber hose vulcanized by the method of the present invention.

DESCRIPTION OF THE PREFERRED EMBODIMENT

A layer of heat-resistant synthetic resin is placed over the outer periphery of an extruded unvulcanized rubber hose. The synthetic resin does not adhere to the rubber hose material, is characterized by a very small absorption of microwave radiation, and has a melting point higher than the vulcanizing temperature. Examples of such resin are non-polar resins. The rubber hose is heated in a microwave vulcanizing tank to a temperature which causes partial vulcanization of the hose, but does not cure the resin layer. In this way, only the rubber is cured and foaming which occurs during curing is also prevented.

The rubber hose is then placed in a heated vulcanizing tank until vulcanization of the hose is completed by heat conduction through the vulcanizing medium. The pressure inside the vulcanizing tank is normal atmospheric pressure. Upon completion of vulcanization, the heat-resistant resin layer is peeled off and removed.

The present invention is described below in greater detail with reference to the drawings.

A rubber hose 10 manufactured according to the present invention comprises an inner rubber tube 11, a reinforcing layer 12, and an outer rubber tube 13. The inner rubber tube 11 and the outer rubber tube 13 may be made of natural rubber or of various synthetic rubber compounds depending on the use of the hose. In the reinforcing layer 12, steel wire or synthetic fiber is arranged in a braid or a spiral. Although the rubber hose is provided with only one reinforcing layer in the drawings to simplify the explanation of the process, plural layers are generally provided depending on the pressure at which the rubber hose is to be used. In case plural reinforcing layers are provided, an intermediate rubber layer is interposed between the reinforcing layers to enhance the bonding.

Reference numeral 14 denotes a flexible mandrel made of synthetic resin, the outer diameter thereof being configured to the inner diameter of the hose to be manufactured.

Reference numeral 15 denotes a resin layer to be provided over the outer periphery of the outer rubber tube 13 during vulcanization.

When vulcanization is completed, the flexible mandrel 14 is taken out and the resin layer 15 is peeled off and removed. The flexible mandrel 14 and the resin layer 15 are not components of the rubber hose, but they are illustrated as integral parts of the hose to facilitate the explanation of the process.

The continuous vulcanization according to the present invention is described below.

First, as in the conventional continuous vulcanization, the inner rubber tube 11 is extruded on the flexible mandrel 14 using an extruder 20. After the reinforcing layer 12 is braided on the outer periphery of the extruded inner tube 11 using a braider 21, the outer rubber tube 13 is extruded by an extruder 22 over the entire surface of the reinforcing layer 12 to completely and tightly cover the reinforcing layer. It is preferable to coat an adhesive on the reinforcing layer 12, if necessary, and dry the adhesive using a dryer before covering the reinforcing layer with the outer tube.

The steps of providing the resin layer and conducting the vulcanization are described below. By means of a resin extruder 23 the resin layer 15 is provided tightly over the outer periphery of the outer rubber tube 13 in a uniform thickness. Resins such as polytetrafluoroethylene (Teflon) or polymethylpentene which have a small microwave absorption and are heat-resistant are used for forming the resin layer 15. The resin layer 15 is applied in a thickness which is sufficient to prevent foaming of the rubber during the subsequent vulcanization by microwave, for example 1 mm to 2 mm.

Since the resin layer 15 extruded from the extruder 23 is too hot and can be easily deformed, the hose is passed in a cooling tank 24 for cooling and hardening. After the resin layer 15 has been cooled and hardened, the unvulcanized rubber hose 10 is placed in a microwave vulcanizing tank 25.

Vulcanization in the microwave vulcanizing tank 25 is carried out to vulcanize/cure the rubber partially while avoiding softening of the resin layer. That is, the microwave radiation selectively heats the unvulcanized rubber hose to a vulcanizing temperature and partially cures the rubber in an initial vulcanization stage. Since the resin layer 15 is made of heat-resistant resin which has a small microwave absorption, it is not likely to generate heat or soften, and the unvulcanized rubber hose alone can therefore be heated. Moreover, as the resin layer 15 is held in close contact with the rubber hose, it is capable of preventing foaming of the rubber during curing.

After the vulcanized rubber hose has been selectively heated to a vulcanizing temperature in the microwave vulcanizing tank 25, thereby becoming partially cured in an initial vulcanization stage, the hose is immediately transferred to a vulcanizing tank 26 (LCM, PCM, HAV).

In the vulcanizing tank 26, the rubber hose is completely vulcanized at the same time that the resin layer is softened. In this second vulcanization stage, the partially vulcanized rubber hose is heated for a given time period by heat conduction through the heating medium in the vulcanizing tank 26. Vulcanization of the rubber is completed by this heating in the second vulcanization stage. Since the rubber hose at this stage has already been subjected to partial initial vulcanization by microwave, the application of heat in the vulcanizing tank 26 does not cause foaming of the rubber.

Although the resin layer 15 softens due to heating in the vulcanization tank 26 at this point, it is no longer needed for preventing foaming of the rubber. Thus, softening of the resin layer 15 at this stage will not affect the vulcanization. Indeed, heating in the vulcanizing tank 26 is preferable as it facilitates the peeling off of the resin layer 15. This resin layer 15 must be softened in any case and removed by cutting out.

After vulcanization in the vulcanizing tank 26 is completed, the rubber hose 10 is passed through a grooving machine 27 to cut a continuous scratch 17 in the resin layer 15 along its longitudinal direction to a depth not reaching the surface of the hose 10. After cooling the hose with water in a cooler 28, the resin layer 15 is peeled off and removed from the rubber hose 10 at the scratch 17 using a peeling machine 29. The mandrel 14 is then pulled out and the rubber hose is obtained.

EXAMPLE 1

Unvulcanized rubber hose comprising two reinforcement layers with an inner diameter of 10 mm and an outer diameter of 20 mm, an inner rubber tube made of nitrilebutadiene rubber, an outer rubber tube of chloroprene rubber and a braid of nylon yarn in each of the reinforcement layers was manufactured. Then, a layer of polymethylpentene resin was uniformly applied over the unvulcanized rubber hose in a thickness of 1.5 mm. After subjecting the rubber hose to initial vulcanization using 2.5 KW microwave to partially cure the rubber, the rubber hose was vulcanized in a vulcanizing tank at 200° C. for 7 minutes. Finally, the resin layer was peeled off and the mandrel was pulled out. The rubber hose thus obtained performed well as a pressure hose, and had an excellent appearance free of foaming of the rubber.

The method of the present invention has the following advantages:

(1) By conducting vulcanization in two stages wherein the rubber is first partially cured during the initial vulcanization by microwave heat, then vulcanization is completed in the heated vulcanizing tank for a given period of time, the resin overlayer can prevent foaming of the rubber. This eliminates the need for a special sealing mechanism and pressurizing means to maintain a high pressure in the vulcanizing apparatus.

(2) Because microwave is used in the initial partial vulcanization of the rubber, the resin layer itself is not heated but maintains its hardened state. Thus, a thin layer of resin is sufficient to prevent foaming, whereas a thicker layer would be required in conventional vulcanization depending solely on heat conduction through a hot heating medium in the vulcanizing tank. Therefore, resin consumption can be reduced in the method of this invention.

(3) Because only the rubber material is selectively caused to generate heat from inside in a short period of time as it absorbs microwave energy, less time is required for vulcanization. Thus, a vulcanizing tank with a shorter length can be used, and savings in the thermal energy necessary for operating the tank can be achieved.

(4) Because the resin layer hardly generates heat or softens but maintains its hardened state during the microwave vulcanization step, there is no danger of the rubber hose becoming deformed or curved.

(5) Because the resin layer is not adhered to the hose material, it can be pulverized and put to repeated use after it has been removed.

(6) When compared to the conventional vulcanization which employs lead coating, the present invention poses no hazard to man and the environment.

What is claimed is:

1. A method for continuously vulcanizing a hose comprising:

providing tightly on the outer periphery of a continuously moving extruded hose of unvulcanized rubber an extruded covering layer of heat-resistant resin which has a small microwave absorption and a melting point higher than the vulcanizing temperature of said unvulcanized rubber;

cooling the resin covered hose to harden the resin covering;

applying microwave radiation to the resin covered hose in a microwave vulcanizing tank whereby the rubber hose is selectively heated and is partially vulcanized in an initial vulcanization stage;

maintaining the partially vulcanized resin-covered hose in a heated vulcanizing tank under normal pressure until vulcanization of the rubber is completed by heat conduction by means of a heating medium provided in the tank, whereby the resin covering is also softened;

peeling off the softened resin covering.

2. The method for continuously vulcanizing a hose as in claim 1, wehrein the heat-resistant resin is a non-polar resin.

3. The method for continuously vulcanizing a hose as in claim 1, wherein the heat-resistant resin is selected from the group consisting of polytetrafluoroethylene and polymethylpentene.

4. The method for continuously vulcanizing a hose as in claim 1, wherein the thickness of the layer of heat-resistant resin is between 1 mm and 2 mm.

* * * * *